May 29, 1928.  
G. I. GANN  
1,671,710  
GAUGE  
Filed May 16, 1927

George I. Gann  
Inventor

By C. A. Snow & Co.  
Attorneys.

Patented May 29, 1928.

1,671,710

UNITED STATES PATENT OFFICE.

GEORGE I. GANN, OF ST. LOUIS, MISSOURI.

GAUGE.

Application filed May 16, 1927. Serial No. 191,763.

The present invention relates to water gauge tubes, the primary object of the invention being to provide means for converting the usual water gauge tube into a gauge for registering the specific gravity of treated water in locomotive boilers, novel means being provided for supporting a float within the gauge tube.

An object of the invention is to provide means for trapping water at the upper and lower ends of the tube so that the water in the tube will remain at a constant level and will not be affected by the motion of the locomotive, to the end that an accurate reading may be taken at all times.

Another object of the invention is to provide valves at the upper and lower ends of the gauge tube, so that the water may be shut off at the upper and lower ends of the gauge tube should the tube become broken.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
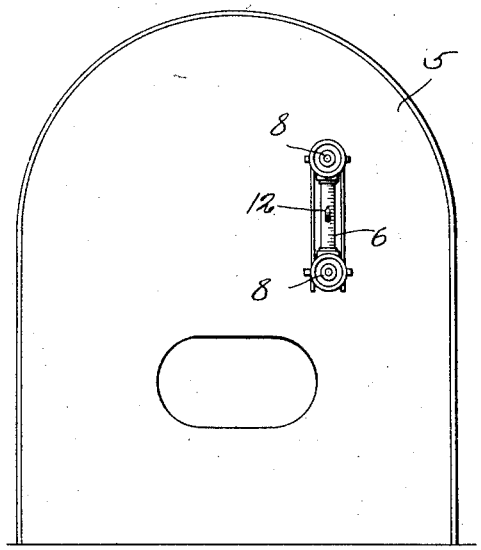
Figure 1 is a front elevational view of a boiler equipped with a gauge tube constructed in accordance with the invention.
Figure 2:
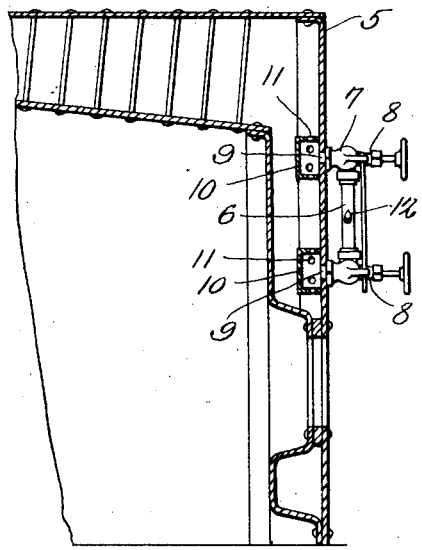
Figure 2 is a vertical sectional view through the forward portion of the boiler.
Figure 3:
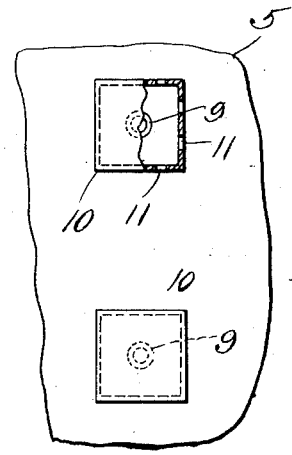
Figure 3 is a fragmental elevational view showing the water supply boxes at the ends of the gauge tube, one of the boxes being shown in section.

Referring to the drawing in detail, the reference character 5 designates a boiler which is supplied with a gauge tube 6 designed for gauging the specific gravity of the treated water in the boiler.

As shown, the gauge tube is in communication with the interior of the boiler through the couplings 7, which couplings embody valve members 8 which may be operated to cut off the passage of water from the boiler to the gauge tube, in the event that the tube should become accidentally broken.

The couplings 7 have extensions 9 that extend through the wall of the boiler and communicate with the water boxes 10 that are supported on the inner surface of the front wall of the boiler, the boxes being provided with openings 11 formed in the walls thereof so that water may pass into these boxes and be trapped in the boxes to the end that the water in the boxes and tube will not be affected by the movements of the boiler or locomotive in which the boiler is positioned.

It might be further stated that in gauge tubes of this character, a weighted float 12 is employed for registering the specific gravity of the water in the tube, and due to the construction of the boxes, the float will be held stationary under normal conditions and will not move with the movements of the water.

It will also be seen that due to the boxes 10, the water in the tube will be prevented from surging in the gauge tube, while the water in the boiler is circulating under intense heat.

I claim:

A gauge tube for boilers embodying tube couplings, a gauge tube having its ends connected with the coupling and establishing communication between the couplings, box-like containers fitted within the boilers to which the tube couplings are connected, said box-like containers having openings formed in the sides thereof to admit fluid to the containers, and valves in the couplings for controlling the passage of fluid to the gauge tube.

In testimony that I claim the foregoing as my own, I have hereto affixed my signature.

GEORGE I. GANN.